(12) United States Patent
Fukayama et al.

(10) Patent No.: US 6,741,299 B2
(45) Date of Patent: May 25, 2004

(54) LIQUID CRYSTAL DISPLAY DEVICE

(75) Inventors: Norihisa Fukayama, Mobara (JP);
Naoto Kobayashi, Mobara (JP);
Fumitoshi Matsuda, Chiba (JP);
Yoshihiro Imajo, Mobara (JP); Yoko Ota, Mobara (JP)

(73) Assignees: Hitachi, Ltd., Tokyo (JP); Hitachi Device Engineering Co., Ltd., Mobara (JP)

( * ) Notice: Subject to any disclaimer, the term of this patent is extended or adjusted under 35 U.S.C. 154(b) by 13 days.

(21) Appl. No.: 09/797,598

(22) Filed: Mar. 5, 2001

(65) Prior Publication Data

US 2001/0019377 A1 Sep. 6, 2001

(30) Foreign Application Priority Data

Mar. 3, 2000 (JP) ........................................ 2000-058681

(51) Int. Cl.[7] ........................ G02F 1/1333; H05K 5/00; H05F 1/16
(52) U.S. Cl. ........................ 349/58; 361/681; 361/752; 455/90
(58) Field of Search .................... 349/58; 361/681, 361/814; 261/752; 455/90

(56) References Cited

U.S. PATENT DOCUMENTS

| | | | | |
|---|---|---|---|---|
| 5,436,745 A | * | 7/1995 | Voisin et al. | 359/88 |
| 5,808,707 A | * | 9/1998 | Nibori et al. | 349/60 |
| 5,872,606 A | * | 2/1999 | Kim | 349/58 |
| 5,905,477 A | | 5/1999 | Kuwayama et al. | |
| 5,936,914 A | * | 8/1999 | Yamaguchi et al. | 368/205 |
| 5,946,061 A | * | 8/1999 | Kurihara et al. | 349/58 |
| 6,025,901 A | * | 2/2000 | Adachi et al. | 349/151 |
| 6,064,565 A | * | 5/2000 | Ishihara et al. | 361/681 |
| 6,144,423 A | * | 11/2000 | Kim | 349/58 |
| 6,195,141 B1 | * | 2/2001 | Kawano et al. | 349/58 |
| 6,212,067 B1 | * | 4/2001 | Nakajima et al. | 361/681 |
| 6,229,695 B1 | | 5/2001 | Moon | |
| 6,292,239 B1 | * | 9/2001 | Nagamura et al. | 349/58 |

FOREIGN PATENT DOCUMENTS

| EP | 0 947 910 A2 | 10/1999 |
|---|---|---|
| KR | 2000-0000732 | 1/2000 |

* cited by examiner

*Primary Examiner*—Toan Ton
*Assistant Examiner*—Hoan C. Nguyen
(74) *Attorney, Agent, or Firm*—Antonelli, Terry, Stout & Kraus, LLP

(57) ABSTRACT

In order to install a liquid crystal display device comprising a liquid crystal display element, a frame being arranged at a displaying surface side thereof, a light source being arranged at an opposite side to the displaying surface side, and a housing member for housing the light source to an exterior case easily and surely, the present invention provides a screw member to which a fitting screw for fixing the liquid crystal display device to the exterior case is screwed at a side wall of the housing member, a protruded portion being protruded in a thickness direction of the liquid crystal display device at the side wall having the screw member, and an opening which the protruded portion is inserted into in the frame, respectively.

7 Claims, 14 Drawing Sheets

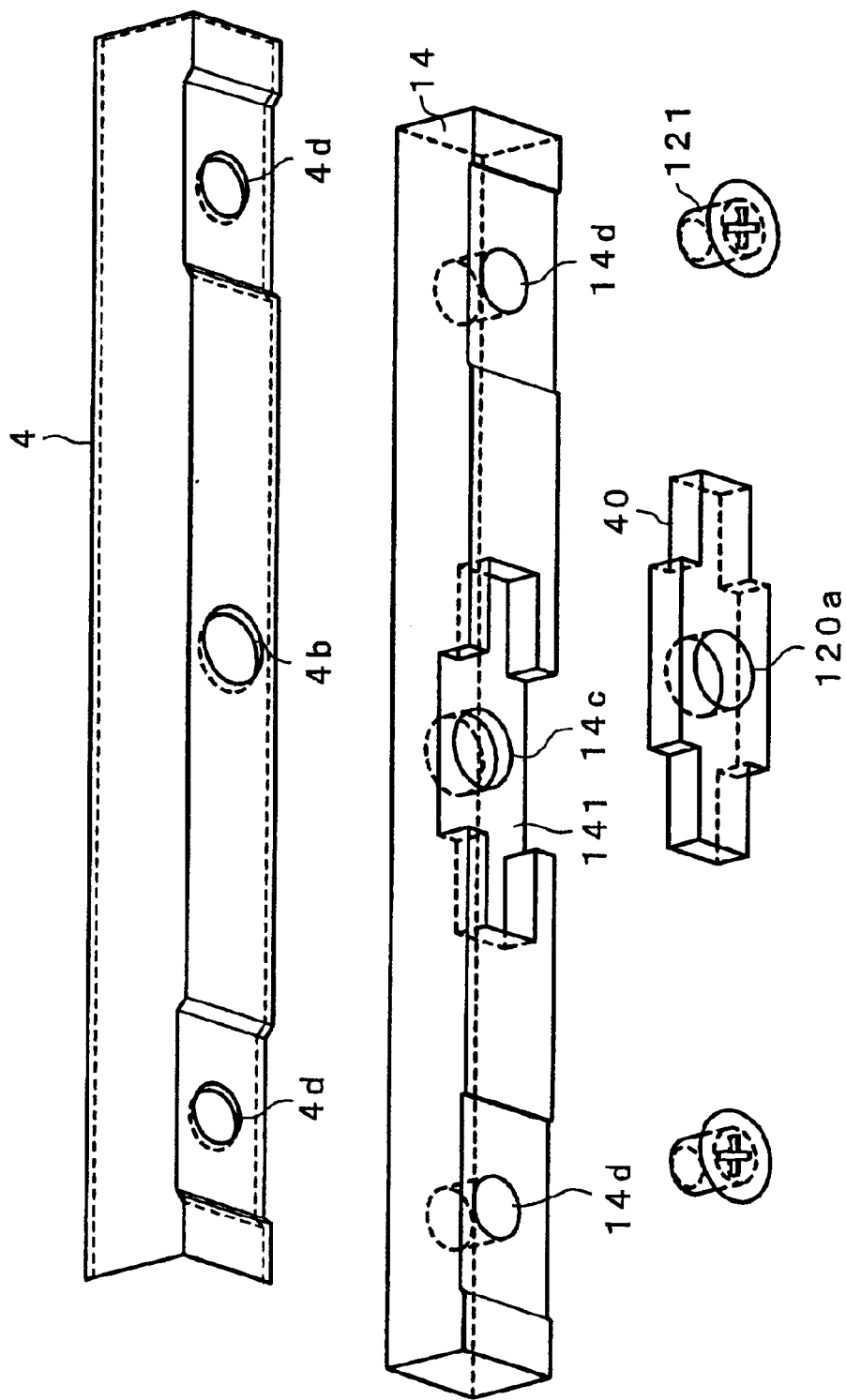

LIQUID CRYSTAL DISPLAY DEVICE

BACKGROUND OF THE INVENTION

1. Field of the Invention

The present invention relate to a liquid crystal display device used for a personal computer, a work station, or the like, and particularly to a technique effective in reduction in picture frame width of a liquid crystal display device, and in reduction in thickness thereof.

2. Description of the Related Art

An STN (Super Twisted Nematic) system or a TFT (Thin Film Transistor) liquid crystal display module is widely used as a display device of a notebook-size personal computer or the like.

The liquid crystal display module is constituted by a liquid crystal display panel in which a driving circuit portion is arranged at its periphery and a backlight unit for illuminating the liquid crystal display panel.

The backlight unit is constituted by, for example, a light guide body for guiding light radiated from a light source to a portion distant from the light source and for uniformly irradiating the whole liquid crystal display panel with the light, a cold-cathode fluorescent lamp as a linear light source arranged in the vicinity of the light guide body, along a side of the light guide body, and in parallel with the side, a diffusion sheet arranged on the light guide body, a lens sheet (also called a prism sheet) arranged on the diffusion sheet, and a reflection sheet arranged to extend to a lower side of the light guide body, which are housed in a mold.

Incidentally, the technique like this is disclosed in, for example, Japanese Patent Publication No. 19474/1985, Japanese Utility Model Unexamined Publication No. 22780/1992, and U.S. Pat. No. 5,835,139.

SUMMARY OF THE INVENTION

FIG. 22 is a schematic view for explaining an example of a fitting method for fitting a liquid crystal display module to a notebook-size personal computer.

In the drawing, reference numeral 100 designates an outer case of a display portion of a notebook-size personal computer; and 101, an inner case of the display portion of the notebook-size personal computer. As shown in the drawing, a liquid crystal display module 102 is fixed to the outer case 100 of the notebook-size personal computer by fitting screws 120 through a side beam 110.

Thus, inserts to which the fitting screws 120 are screwed, are embedded in the mold of the liquid crystal display module 102.

Incidentally, although the side beam 110 and the fitting screws 120 are provided at both sides of the liquid crystal display module 102, they are omitted in FIG. 22.

However, in recent years, as a picture frame width of the liquid crystal display module is reduced and the thickness thereof is reduced, the thickness of the mold itself is further reduced to, for example, 5.0 mm or less. "The picture frame" of the liquid crystal display module described in this present specification designates, for example, a frame-like portion surrounding an opening both of which are provided in an upper surface of the liquid crystal display module 102 shown in FIG. 22.

Thus, in a conventional liquid crystal display module, there has been a problem that it is difficult to certainly fit the insert in the mold.

Besides, there is also known a method in which a compromise plate nut is used, and the fitting screw 120 is screwed to this compromise plate nut, so that the liquid crystal display module is fitted to the notebook-size personal computer.

In this case, the fitting screw 120 is prevented from being dropped off from the frame by inserting the compromise plate nut into a notch of the mold (the inner case) and pressing it with a side of the frame (an outer case) which is fitted in this so as to cover the outer periphery of the mold.

However, there has been a problem that it is difficult to simultaneously fit four or more compromise plate nuts in the notches of the mold and to cover them with the frame.

The present invention has been made to solve the problems of the prior art, and an object of the present invention is to provide a technique in a liquid crystal display device which enables a screw member to which a fitting screw for fixing a liquid crystal display device to an exterior case is screwed, to be easily and certainly fitted.

Another object of the present invention is to provide a technique in a liquid crystal display device which enables a screw mechanism of a fitting screw for fixing a liquid crystal display device to an exterior case to be simplified.

Still another object of the present invention is to provide a technique which enables the picture frame width of a liquid crystal display device to be reduced.

Still another object of the present invention is to provide a technique which enables the thickness of a liquid crystal display device to be reduced.

The objects, other objects and novel features of the present invention will be clarified by the description of the present specification and the accompanying drawings.

Among the inventions disclosed in the present application, the brief descriptions of the typical ones are as follows:

That is, the present invention is applied to a liquid crystal display device in which a frame member (casing-like member) is fixed in a housing member (typified by a member known as a mold) for housing components (liquid crystal display panel, light source, optical sheet, etc.) of the liquid crystal display device to constitute a so-called liquid crystal display module, and this liquid crystal display module is fixed to an exterior case.

The housing member includes, for example, a main surface and side surfaces formed around its periphery, and optical parts as the components of the liquid crystal display device are housed on the main surface surrounded by the side surfaces.

In the case of the liquid crystal display module provided with a sidelight type light source, a reflection plate, a light guide body, an optical sheet such as a light diffusion sheet and a prism sheet are stacked up in this order on the main surface. The light guide body is arranged in the inside of the housing member so that one of its main surfaces faces the main surface of the housing member, and a light source unit including a fluorescent lamp is provided along at least one of its side surfaces.

In the case of the liquid crystal display module provided with a direct backlight type light source, a reflection plate, a light source unit made of a plurality of fluorescent lamps fixed to this, a light diffusion plate, an optical sheet, and a liquid crystal display panel are stacked up in this order on the main surface.

Either of the light sources is arranged to face a main surface of the liquid crystal display panel opposite to a display surface side (main surface side of a frame member), and irradiates light (illuminating light) radiated from this light source to the main surface of the liquid crystal display panel. Incidentally, this stacking direction of the parts is called a thickness direction of the liquid crystal display device or the liquid crystal display module in the present specification.

The liquid crystal display panel is also called a liquid crystal display element, and is distinguished from the liquid crystal display device including this and its peripheral part. The exterior case is a box in which the liquid crystal display module (also called the liquid crystal display device) including the housing member and the frame member is housed, and corresponds to, for example, a housing of a notebook-size personal computer. Thus, for example, the outer surface of the liquid crystal display module is covered with the exterior case (also called the outer case) except for its display surface (a screen on which an image is displayed).

When the present invention is applied to this sort of liquid crystal display device, a screw tightening member (hereinafter referred to as a "screw member") to which a fitting screw for fixing the liquid crystal display module to the exterior case is screwed, is provided at the side surface (side wall) of the housing member, a protruded portion protruding in the thickness direction of the liquid crystal display module (in other words, in the height direction of the side wall of the housing member) is provided in a region where the screw member of the housing member is provided, and further, an opening in which the protruded member of the housing member is inserted, is provided in the frame member. In the case of the fitting screw having external thread (i.e. being a bolt), the screw member has internal thread formed thereat (as being i.e. Nut).

The aforementioned means is able to sufficiently increase the thickness (in the thickness direction of the liquid crystal display module) of the periphery of the screw member of the housing member.

For example, even if the thickness (in the thickness direction of the liquid crystal display module) of the housing member is made 5.0 mm or less by the reduction in thickness of the liquid crystal display device, the present invention is still able to prevent the screw member from rotating in the housing member or being drawn out therefrom.

Besides, the present invention is characterized in that in a liquid crystal display device, a screw member to which a fitting screw for fixing the liquid crystal display device to an exterior case is screwed, is provided at a side wall of a housing member, a protruded portion protruding in a direction of a tapped hole of the screw member is provided in a region of the side wall of the housing member where the screw member is provided, and further, an opening in which the protruded portion of the housing member is inserted, is provided in a side wall of a frame member.

The aforementioned means is able to reduce the picture frame width of the liquid crystal display module by the thickness of the frame member.

Besides, the present invention is characterized in that in a liquid crystal display device, a screw member to which a fitting screw for fixing the liquid crystal display device to an exterior case is screwed, is provided at a side wall of a housing member, and a sectional shape of the screw member is made such that a length in a direction orthogonal to the thickness direction of the liquid crystal display device is longer than a length in the thickness direction of the liquid crystal display device.

Since the sectional shape of the screw member is made, for example, elliptical or rectangular, the aforementioned means enables to prevent the screw member from rotating in the frame member or being drawn out therefrom.

Besides, the present invention is characterized in that in a liquid crystal display device, a screw member to which a fitting screw for fixing the liquid crystal display device to an exterior case is screwed, is fixed to a side wall of a housing member by adhesion or mechanical means.

Since the screw member is previously fixed to the side wall of the housing member, the aforementioned means facilitates fitting of the screw member to the housing member, and enables to prevent the screw member from being dropped off from the frame member in an assembling process of the liquid crystal display device.

Besides, the present invention is characterized in that in a liquid crystal display device, a screw member to which a fitting screw for fixing the liquid crystal display device to an exterior case is screwed, is inserted in a groove provided in a side wall of a housing member, and an opening of the groove is covered with a frame member.

Since the screw member is held by the groove provided in the housing member, the aforementioned means facilitates fitting of the screw member to the housing member, and enables to prevent the screw member from being dropped off from the frame member in an assembling process of the liquid crystal display device.

Besides, the present invention is characterized in that in a liquid crystal display device, a screw member to which a fitting screw for fixing the liquid crystal display device to an exterior case is screwed, is provided in a concave portion provided in a side wall of a housing member, and is held by a side wall of a frame member and a pawl provided on the side wall of the frame member.

Since the screw member is held by the concave portion provided in the housing member, the side wall of the frame member, and the pawl provided on the side wall of the frame member, the aforementioned means facilitates fitting of the screw member to the housing member, and enables to prevent the screw member from being dropped off from the frame member in an assembling process of the liquid crystal display device.

Besides, the present invention is characterized in that in a liquid crystal display device, a fitting screw for fixing the liquid crystal display device to an exterior case is screwed to a tapped hole provided in a side wall of a frame member.

The aforementioned means enables to simplify a screw mechanism of the fitting screw.

Besides, the present invention is characterized in that in a liquid crystal display device, a fitting screw for fixing the liquid crystal display device to an exterior case, is screwed to a screw member with a spring provided on a frame member.

The aforementioned means facilitates fitting of the screw member to the frame member, and enables to prevent the screw member from being dropped off from the frame member in an assembling process of the liquid crystal display device.

In the case where the liquid crystal display device of the present invention described above is mounted on the housing of a computer, it becomes unnecessary to provide a tapped hole which receives a screw (the aforementioned fitting screw) for fixing the liquid crystal display device to the housing, to the housing member itself. Thus, when the liquid crystal display device (this is already assembled) is mounted on the computer, a mechanical load (vibration, etc.) by rotation of the fitting screw is not directly applied to the housing member. Accordingly, the deformation of the housing member in an assembling process of the computer, and the possibility of the resultant deviation of the liquid crystal display element, the optical sheet, and the like in the liquid crystal display device from the predetermined arrangement can be suppressed. Especially, in the case where the housing member is manufactured as a mold made of a synthetic resin, the effect of preventing the damage of the liquid crystal display device according to the present invention becomes remarkable.

On the other hand, as the liquid crystal display device becomes thinner, the size of the housing member in the thickness direction of the liquid crystal display device also becomes small. Under such circumstances, it becomes difficult to provide the tapped hole to which the fitting screw is screwed, in the side wall of the housing member. If the diameter of the tapped hole is made larger than a predetermined ratio (depending on the material of the housing member) with respect to the height of the side wall of the housing member, the mechanical strength of the tapped hole itself is lowered. Especially, since the screw for fitting the liquid crystal display device to the computer is required to be stronger than the screw used for assembling the liquid crystal display device, its diameter must be made large. On the other hand, in the liquid crystal display device of the present invention, since the tapped hole is not directly formed in the housing member, but is formed in the screw member prepared differently from this or in the side surface of the frame member (especially made of metal), even if the housing member becomes thin, the fixing strength between the liquid crystal display device and the exterior case (housing of the computer, etc.) does not deteriorate. Besides, by providing an opening without screw thread in the side wall of the housing member and by merely inserting the tip of the fitting screw into this, the position of the liquid crystal display device with respect to the exterior case can be further stably held.

Besides, the present invention is characterized in that in a liquid crystal display device in which a driving circuit board is arranged between a liquid crystal display element and a housing member, a concave portion is provided in a region of the driving circuit substrate where a fitting screw for fixing the liquid crystal display device to an exterior case is provided.

Besides, the present invention is characterized in that in a liquid crystal display device in which a driving circuit board is arranged between a liquid crystal display element and a housing member, a region of the driving circuit board where a fitting screw for fixing the liquid crystal display device to an exterior case is provided, is constituted by a flexible wiring board.

According to the aforementioned means, in the case where the driving circuit board is arranged between the liquid crystal display element and the housing member and the thickness of the liquid crystal display module is reduced, interference between the fitting screw and the driving circuit board can be prevented.

These and other objects, features and advantages of the present invention will become more apparent from the following description when taken in conjunction with the accompanying drawings.

BRIEF DESCRIPTION OF THE DRAWINGS

FIG. 5A is a front view of the liquid crystal display module, FIG. 5B is a main portion sectional view showing a sectional structure along line A–A' shown in FIG. 5A, and FIG. 5C is an upper plan view showing a shape of a mold to which the insert is fitted;

FIG. 6A is a front view of the liquid crystal display module, and FIG. 6B is a main portion sectional view showing a sectional structure along line A–A' shown in FIG. 6A;

FIG. 7 is a view for explaining a method of fitting the liquid crystal display module shown in FIG. 1 to a notebook-size personal computer by a conventional fitting method 2;

FIG. 16A is a front view of the liquid crystal display module, FIG. 16B is a main portion sectional view showing a sectional structure along line A–A' shown in FIG. 16A, and FIG. 16C is a perspective view showing a shape of a metal plate 40 formed in the C-shaped nut;

FIG. 17A is a front view of the liquid crystal display module (frame), and FIG. 17B is a main portion sectional view showing a sectional structure along line A–A' shown in FIG. 17A;

FIG. 21A is a plan view showing the arrangement of a fitting screw, a frame, and a driving circuit board, and FIG. 21B is a main portion sectional view showing the arrangement of the fitting screw, the frame, and the driving circuit board.

DETAILED DESCRIPTION

Figure 1:
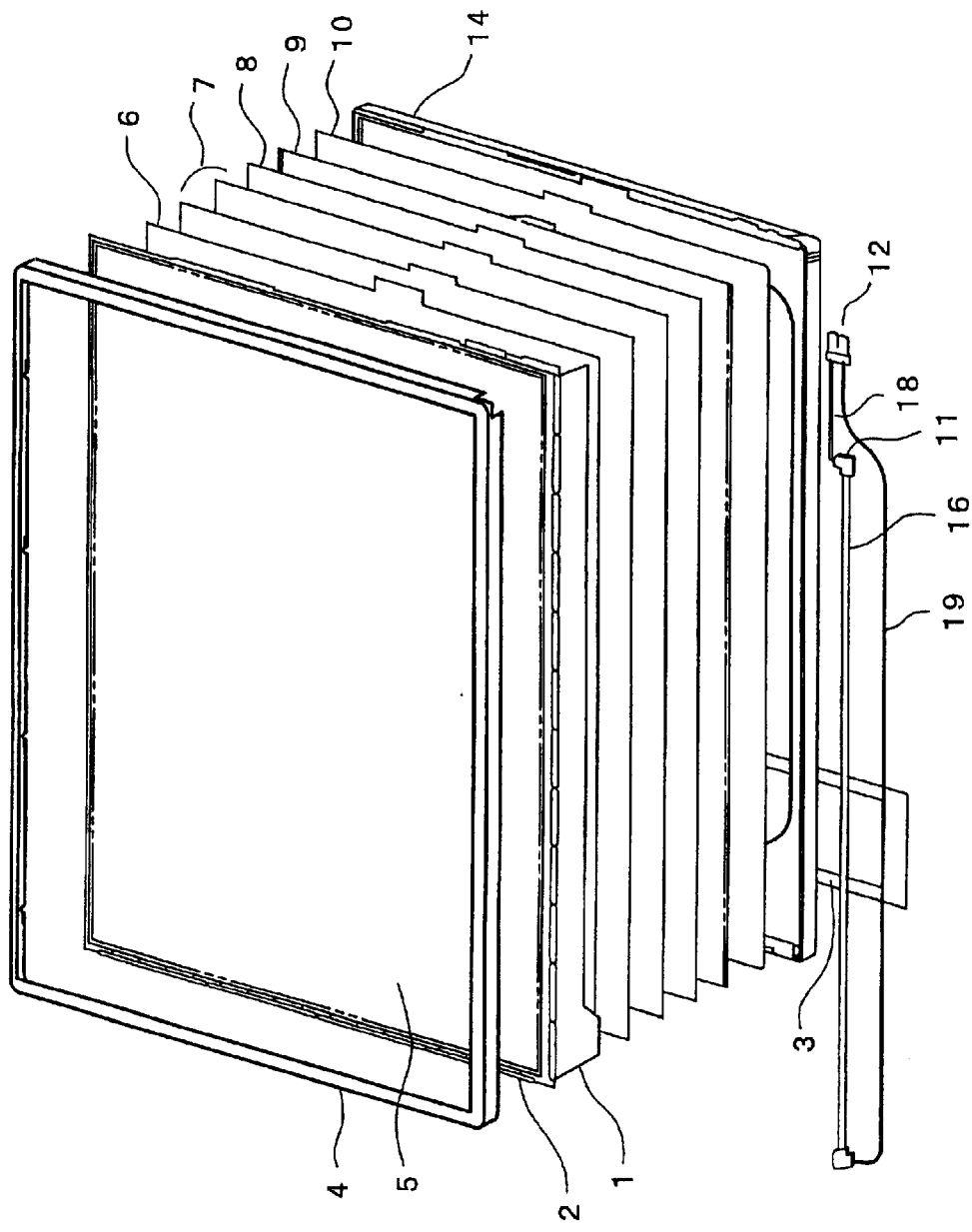
FIG. 1 is an exploded perspective view showing a schematic structure of a TFT system liquid crystal display module (LCM) to which the present invention is applied.

Hereinafter, embodiments of the present invention will be described in detail with reference to the drawings.

Incidentally, in all drawings for the description of the embodiments, portions having the same function are designated by the same reference characters and the duplicate explanation is omitted.

[Embodiment 1]
<Basic structure of a TFT system liquid crystal display module to which the present invention is applied>

FIG. 1 is an exploded perspective view showing a schematic structure of a TFT system liquid crystal display module (LCM) to which the present invention is applied.

The liquid crystal display module (LCM) shown in FIG. 1 is constituted by a casing-shaped frame 4 made of a metal plate, a liquid crystal display panel (LCD: liquid crystal display element according to the present invention) 5, and a backlight unit.

The liquid crystal display panel 5 is constructed such that a TFT board on which a pixel electrode, a thin film transistor and the like are formed, and a filter board on which a counter electrode, a color filter, and the like are formed, are superposed on each other with a predetermined interval, both the boards are bonded to each other by a seal member provided into a frame shape in the vicinity of the periphery between both the boards, a liquid crystal is injected into the inside of the seal member between both the boards from a liquid crystal injection port provided in a part of the seal member, sealing is made, and further, polarizing plates are bonded to the outside of both the boards.

Here, a plurality of drain drivers and gate drivers made of a semiconductor integrated circuit device (IC) are mounted on a glass board of the TFT board.

Driving power, display data, and control signals are supplied to the drain drivers through a flexible printed wiring board 1, and driving power and control signals are supplied to the gate drivers through a flexible printed wiring board 2.

These flexible printed wiring boards 1, 2 are connected to a driving circuit board 3 provided at a rear side of the backlight unit.

The backlight unit of the liquid crystal display module of this embodiment is constructed such that a cold-cathode fluorescent lamp 16, a wedge-shaped light guide body (a side shape of which is trapezoid) 9, diffusion sheets 6, 8, lens sheets 7, and a reflection sheet 10 are fitted in the order shown in FIG. 1 in a mold 14 having a side wall and formed into a frame shape.

Incidentally, in FIG. 1, reference numeral 11 designates a rubber bush; 12, a connector; and 18, 19, cables.

<Structure of the backlight unit of the liquid crystal display module shown in FIG. 1>

Figure 2:
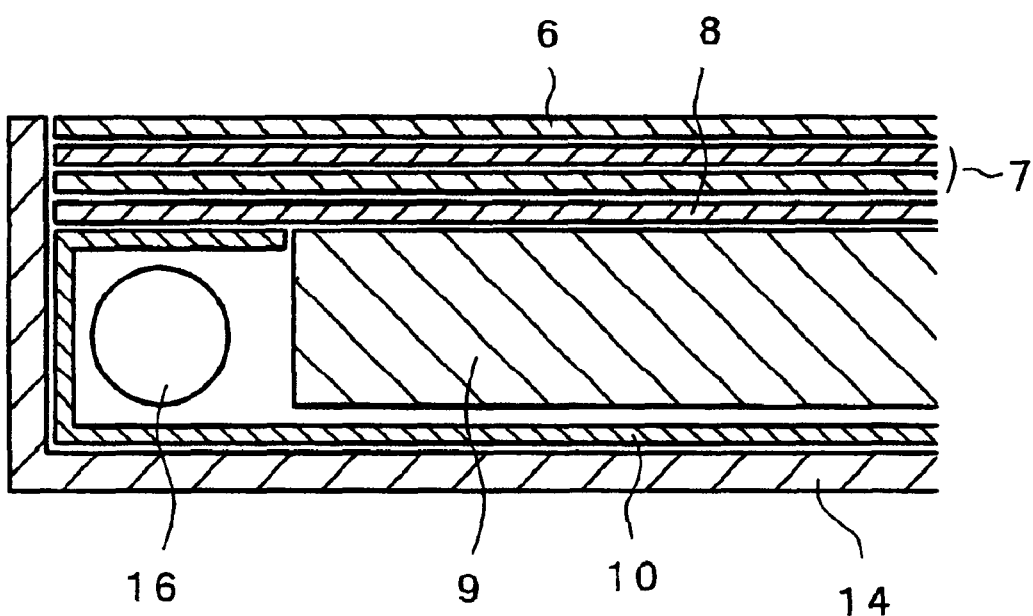
FIG. 2 is a sectional view showing a main portion sectional structure of a backlight unit of the liquid crystal display module shown in FIG. 1.

FIG. 2 is a sectional view showing a main portion sectional structure of the backlight unit of the liquid crystal display module shown in FIG. 1.

Incidentally, FIG. 2 shows the sectional structure obtained by cutting along a plane orthogonal to the cold-cathode fluorescent lamp 16.

As shown in FIG. 2, the cold-cathode fluorescent lamp 16 is arranged in the vicinity of a side of the light guide body 9, along the side of the light guide body 9, and in parallel with the side of the light guide body 9.

The light guide body 9 guides light radiated from the cold-cathode fluorescent lamp 16 to a portion remote from the cold-cathode fluorescent lamp 16, and uniformly irradiates the whole liquid crystal display panel with the light.

Here, the light guide body 9 is formed into such a wedge shape that its surface facing the cold-cathode fluorescent lamp 16 is formed to be wide and its section becomes small as it goes away from the cold-cathode fluorescent lamp 16.

The diffusion sheets 6, 8 and the two lens sheets 7 are arranged on the light guide body.

The reflection sheet 10 which has a portion of an almost C-shaped sectional shape at the cold-cathode fluorescent lamp and a white or silver inner surface, covers the cold-cathode fluorescent lamp 16 over almost the whole length, and is arranged to extend to the lower side of the light guide body 9.

By this, light radiated in a direction different from the light guide body 9 can be concentrated on the light guide body 9 without waste.

<Fitting method 1 of the liquid crystal display module shown in FIG. 1 to a notebook-size personal computer>

Figure 3:
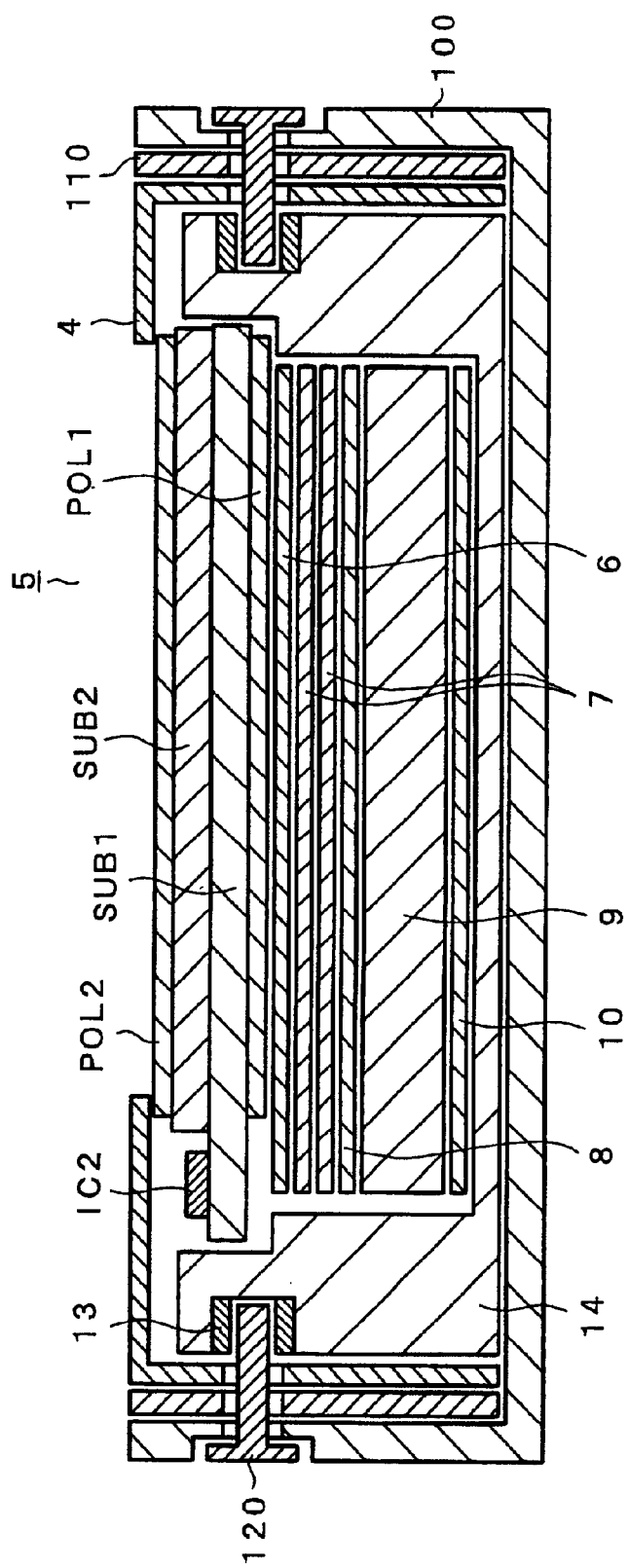
FIG. 3 is a main portion sectional view showing a state where the liquid crystal display module shown in FIG. 1 is fitted to a notebook-size personal computer by a conventional fitting method 1.

FIG. 3 is a main portion sectional view showing a state where the liquid crystal display module shown in FIG. 1 is fitted to a notebook-size personal computer by a conventional fitting method 1. Incidentally, FIG. 3 shows a sectional structure obtained by cutting in the same direction as an extension direction of the cold-cathode fluorescent lamp 16.

As shown in FIG. 3, the liquid crystal display module shown in FIG. 1 includes inserts 13 having internal threads formed therein at four places (only two places are shown in FIG. 3) of sides in the mold 14.

Then, by screwing up fitting screws 120 having external threads formed thereon to the respective inserts 13 through holes formed in an exterior case (for example, a plastic case) 100 of a display portion of the notebook-size personal computer, a metal side beam 110, and the frame 4, the liquid crystal display module is fitted to the notebook-size personal computer.

Besides, as shown in FIG. 3, the liquid crystal display module shown in FIG. 1 is constructed such that the liquid crystal display panel 5 on which the plurality of drain drivers and gate drivers are mounted, is housed between the frame 4 having a display window and the backlight unit.

The region of the display window of the frame 4 constitutes a display region of the liquid crystal display module (LCM), and a region other than this display region, that is, a region of the periphery of the display window of the frame 4 is called a normal picture frame.

Incidentally, in FIG. 3, SUB 1 designates a TFT board; SUB 2, a color filter board; IC2, a gate driver; and POL1, POL2, polarizing plates.

As shown in FIG. 3, in the case where the liquid crystal display module is fitted to the notebook-size personal computer by using the insert 13, force in the rotation direction is applied to the insert 13, and further, if force in the horizontal direction is applied to the notebook-size personal computer, force in the direction of drawing out the insert 13 is applied.

In order to prevent these, it is necessary to improve adhesion to resin which makes the mold 14 and to increase friction by applying knurling to an exterior of the insert 13, and therefore, it becomes necessary to increase the thickness of the mold 14 to a certain degree at the periphery of the insert 13.

However, when the thickness (corresponding to the height of the side wall of the mold 14 in FIG. 3) of the mold itself becomes further thin, for example, 5 mm or less, by the reduction in thickness of the liquid crystal display module, it becomes impossible to secure the sufficient thickness of the mold 14 around the insert 13. For example, in the case where the position of the fitting hole of the insert 13 is made the center of the mold 14 in the thickness direction, since the frame 4 exits, there is a possibility that the thickness of the mold 14 at the upper side of the insert 13 can not be made sufficient.

The liquid crystal display device of the embodiment 1 of the present invention resolves such situations as mentioned previously by features thereof which will be described as follows.

<Feature of a TFT system liquid crystal display module of embodiment 1 of the present invention>

Figure 4:
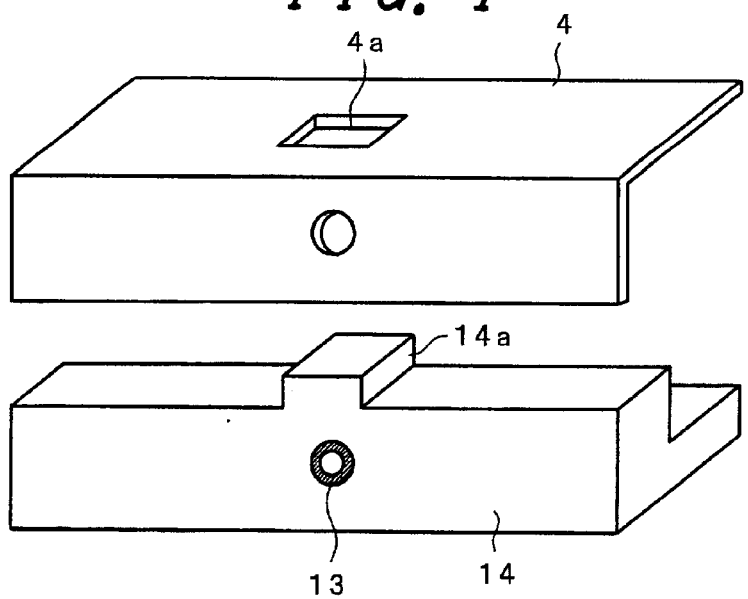
FIG. 4 is a view for explaining a fitting portion of an insert of a liquid crystal display module of embodiment 1 of the present invention.

FIG. 4 is a view for explaining a fitting portion of an insert 13 of a liquid crystal display module of the present embodiment.

Incidentally, the present embodiment will be described with reference to FIGS. 1 to 3 and on the basis of the aforementioned liquid crystal display module.

FIG. 4 is a close-up perspective view showing respective portions of the frame 4 and the mold 14 relating to a mounting structure for fitting the liquid crystal display module as shown in FIG. 3 to the exterior case by the fitting screw 120, together with the insert 13 fitted in the mold 14, and illustration of portions other than those and members (exterior case 100, fitting screw 120, etc.) is omitted.

As shown in FIG. 4, the present embodiment is characterized in that an opening (slot) 4a is provided at an upper portion of a region where a fitting hole of the insert 13 is provided, and a protruded portion 14a protruding to the opening 4a of the frame 4 is provided on the mold 14.

On this account, even if the thickness of the mold itself is made, for example, 5.0 mm or less, by the reduction in the thickness of the liquid crystal display module, the thickness of the mold 14 around the insert 13 can be sufficiently increased, and the present embodiment is still able to prevent the inserts 13 from rotating in the mold 14 or being drawn off therefrom.

Incidentally, in the present embodiment, it is necessary that the opening 4a of the frame 4 has a sufficient size so that the protruded portion 14a of the mold 14 goes therein.

Besides, it is desirable that the height of the protruded portion 14a is almost equal to the thickness of the frame 4, and the width of the protruded portion 14a is at least the outer diameter of the insert 13 +about 1 mm. Further, the protruded portion 14a may be used as a protruded portion for locating of the mold with respect to the frame.

[Embodiment 2]
<Feature of a TFT System Liquid Crystal Display Module of Embodiment 2 of the Present Invention>

Figure 5A:
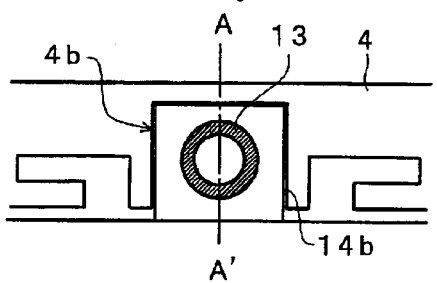
FIGS. 5A to 5C are views for explaining a fitting portion of an insert of a liquid crystal display module of embodiment 2 of the present invention.
Figure 5B:
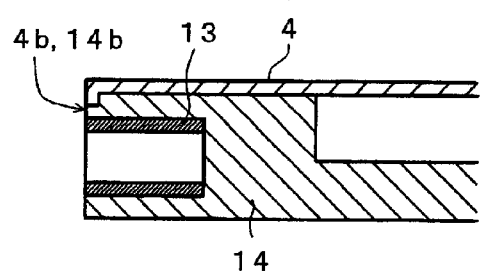
Figure 5C:
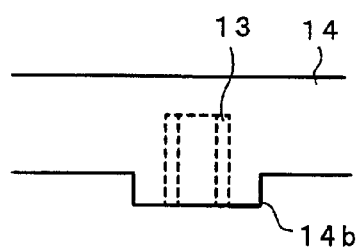

FIGS. 5A to 5C are views for explaining a fitting portion of an insert 13 of a liquid crystal display module of embodiment 2 of the present embodiment, FIG. 5A is a front view, FIG. 5B is a main portion sectional view showing a sectional structure along line A–A' shown in FIG. 5A, and FIG. 5C is an upper plan view showing a shape of a mold 14.

Incidentally, since the structure of the liquid crystal display module of the present embodiment is also the same as the liquid crystal display module shown in FIG. 1, in FIGS. 5A to 5C, only portions relating to a fitting screw 120 are shown similarly to FIG. 4, and the other structure is omitted.

As shown in FIGS. 5A and 5B, in the present embodiment, an opening 4b is provided at a side wall of a frame 4 made to face a side wall of a mold 14 in which the insert 13 is provided.

In the present embodiment, although the opening 4b is formed as a notch (inverted U-shape without a lower side thereof) which is made to correspond to the thin liquid crystal display module, it may be replaced by a rectangular or circular hole in accordance with the shape of the liquid crystal display module.

A protruded portion 14b is provided at the side wall of the mold 14 in which the insert 13 is provided, and this protruded portion 14b is fitted in the opening 4b of the frame 4.

Then, in the present embodiment, the fitting screw 120 is screwed up to the insert 13 through holes formed in an exterior case 100 of a display portion of a notebook-size personal computer and a metal side beam 110, and the liquid crystal display module is fitted to the notebook-size personal computer.

Accordingly, in the present embodiment, the picture frame width of the liquid crystal display module can be reduced by the thickness of the frame 4.

[Embodiment 3]
<Feature of a TFT System Liquid Crystal Display Module of Embodiment 3 of the Present Invention>

Figure 6A:
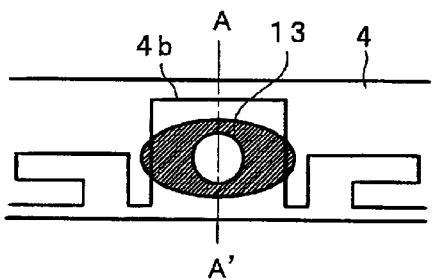
FIGS. 6A and 6B are views for explaining a fitting portion of an insert of a liquid crystal display module of embodiment 3 of the present invention.
Figure 6B:
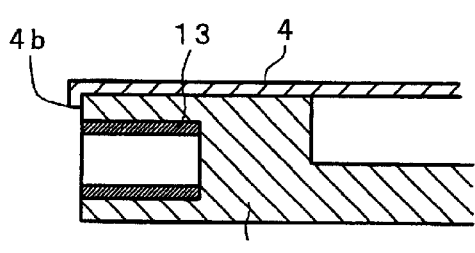

FIGS. 6A and 6B are views for explaining a fitting portion of an insert 13 of a liquid crystal display module of the present embodiment, FIG. 6A is a front view, and FIG. 6B is a main portion sectional view showing a sectional structure along line A–A' shown in FIG. 6A.

Incidentally, since the structure of the liquid crystal display module of the present embodiment is also the same as the liquid crystal display module shown in FIG. 1, in FIGS. 6A and 6B, only portions relating to a fitting screw 120 are shown similarly to FIG. 4, and the other structure is omitted.

As shown in FIG. 6A, the present embodiment is characterized in that the sectional shape of the insert 13 is made elliptical.

On this account, even if the thickness of a mold itself is made, for example, 5.0 mm or less, by the reduction in thickness of the liquid crystal display module, the present embodiment is still able to prevent the inserts 13 from rotating in the mold 14 or being drawn out therefrom.

Incidentally, in the present embodiment, even if the sectional shape of the insert 13 is made rectangular instead of making the sectional shape of the insert elliptical, the same effect can be obtained.

[Embodiment 4]
<Fitting Method 2 of the Liquid Crystal Display Module Shown in FIG. 1 to a Notebook-Size Personal Computer>

FIG. 7 is a view for explaining a method of fitting the liquid crystal display module shown in FIG. 1 to a notebook-size personal computer by a conventional fitting method 2.

Incidentally, since the structure of the liquid crystal display module of the present embodiment is also the same as the liquid crystal display module shown in FIG. 1, in FIG. 7, only portions relating to the fitting screw 120 are shown similarly to FIG. 4, and the other structure is omitted.

The present embodiment shown in FIG. 7 is characterized in such structure that instead of providing the insert 13 in the mold 14, a compromise plate nut 40 is interposed between the frame 4 and the mold 14, and a fitting screw (120 of FIG. 3) is screwed to this compromise plate nut 40 to mount the liquid crystal display module to an exterior case (100 of FIG. 3).

By this structural feature, the present embodiment is different from those shown in FIGS. 4 to 6.

In the method shown in FIG. 7, the compromise plate nut 40 shown in the drawing is fitted in a notch 141 of the mold 14, and this compromise plate nut 40 is covered with the frame 4 to prevent it from being dropped off. The notch 141 can also be provided by forming a concave portion or a groove in the outside side wall of the mold 14.

By this, the rotation of the compromise plate nut 40 in the up and down and right and left directions is restricted by engagement with the notch 141 of the mold 14, and the movement in the pushing direction into the inside of the liquid crystal display module is restricted by the wall of the mold 14.

The frame 4 is fixed to the mold 14 in such a manner that its inside side wall is made to face the outside side wall of the mold 14, and after the frame is fitted to the exterior of the mold 14 while the positions of the opening 4b and the notch 141 are made coincident with each other, two screws 121 are screwed up to tapped holes 14d of the mold 14 through openings 4d of the frame 4.

By this, the movement of the compromise plate nut 40 dropping off from the notch 141 can be prevented by the frame 4.

A fitting screw (120 of FIG. 3) is screwed up to a tapped hole 120a of the compromise plate nut 40 through the hole (opening) 4b formed in an exterior case (100 of FIG. 3) of the display portion of the notebook-size personal computer, a metal side beam (110 of FIG. 3), and the frame 4, so that the liquid crystal display module is fitted to the notebook-size personal computer.

Incidentally, when the fitting screw (120 of FIG. 3) is screwed in the tapped hole 120a, its portion protruding from the tapped hole 120a is housed in an opening 14c provided in the notch 141 of the mold 14.

As set forth above, in order to fix the liquid crystal display module to the exterior case (100 of FIG. 3) of the display portion of the notebook-size personal computer, four or more places are normally screwed up.

Since the compromise plate nut 40 is apt to be dropped off from the mold 14 if the frame 4 does not exist, it is difficult to fit the four or more compromise plate nuts 40 to the notches 141 of the mold 14 and to cover them with the frame 4 at the same time.

Thus, conventionally, after the mold 14 is covered with the frame 4, the compromise plate nut 40 is inserted from the back of the module.

However, in the conventional liquid crystal display module, when the compromise plate nut 40 is inserted from the back of the module after the mold 14 is covered with the frame 4, in order to facilitate the insertion of the compromise plate nut 40 into a gap between the mold 14 and the frame 4, it is necessary that the mold 14 is slanted or the height of the notch 141 provided in the mold 14 is lowered.

Like this, in the case where the liquid crystal display module shown in FIG. 1 is fitted to the notebook-size personal computer by the conventional fitting method 2, there has been a problem that it is difficult to balance an insertion property of the compromise plate nut 40 with falling out.

The liquid crystal display device of the embodiment 4 of the present invention resolves such situations as mentioned previously by features thereof which will be described as follows.

<Feature of a TFT system liquid crystal display module of embodiment 4 of the present invention>

Figure 8:
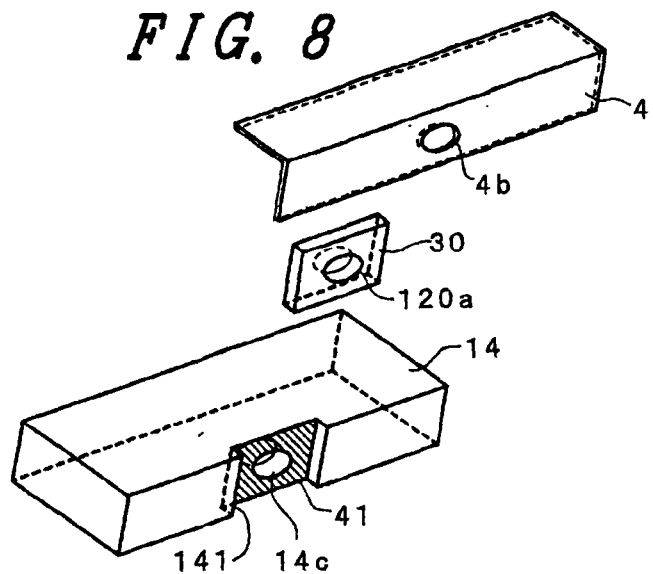
FIG. 8 is a view for explaining a fitting method of a plate nut of a liquid crystal display module of embodiment 4 of the present invention.

FIG. 8 is a view for explaining a fitting method of a plate nut of a liquid crystal display module of the present embodiment.

Incidentally, since the structure of the liquid crystal display module of the present embodiment is also the same as the liquid crystal display module shown in FIG. 1, in FIG. 8, only portions relating to fixing (see FIG. 3) of a liquid crystal display device and an exterior case of a personal computer or the like by a fitting screw 120 are shown similarly to FIG. 7, and illustration of the other structure is omitted.

In the present embodiment, before a mold 14 is covered with a frame 4, a plate nut 30 is fixed to a predetermined position of the mold 14 by an adhesive 41.

In an example of FIG. 8, the side wall of the mold 14 is partially made thin to form a concave portion (corresponding to the aforementioned notch) 141. The adhesive 41 is coated on the bottom of the concave portion 141.

The plate nut 30 has a tapped hole 120a to which a fitting screw (120 of FIG. 3) is screwed, similarly to the compromise plate nut 40.

Incidentally, in the present embodiment, the plate nut 30 may be the compromise plate nut 40 shown in FIG. 7, or may be a general rectangular plate nut.

Further, a roughness for positioning may be provided to the plate nut 30 and the mold 14, or a pressure sensitive adhesive double coated tape may be used instead of the adhesive 41.

Like this, since the plate nut 30 is previously fixed to the mold 14 by the adhesive 41 (or, pressure sensitive adhesive double coated tape, double sided adhesive tape), the present embodiment facilitates fitting of the plate nut 30 to the mold 14, and is able to prevent the plate nut 30 from falling out in an assembling process of the liquid crystal display module, and to improve work efficiency.

[Embodiment 5]

<Feature of a TFT system liquid crystal display module of embodiment 5 of the present invention>

Figure 9:
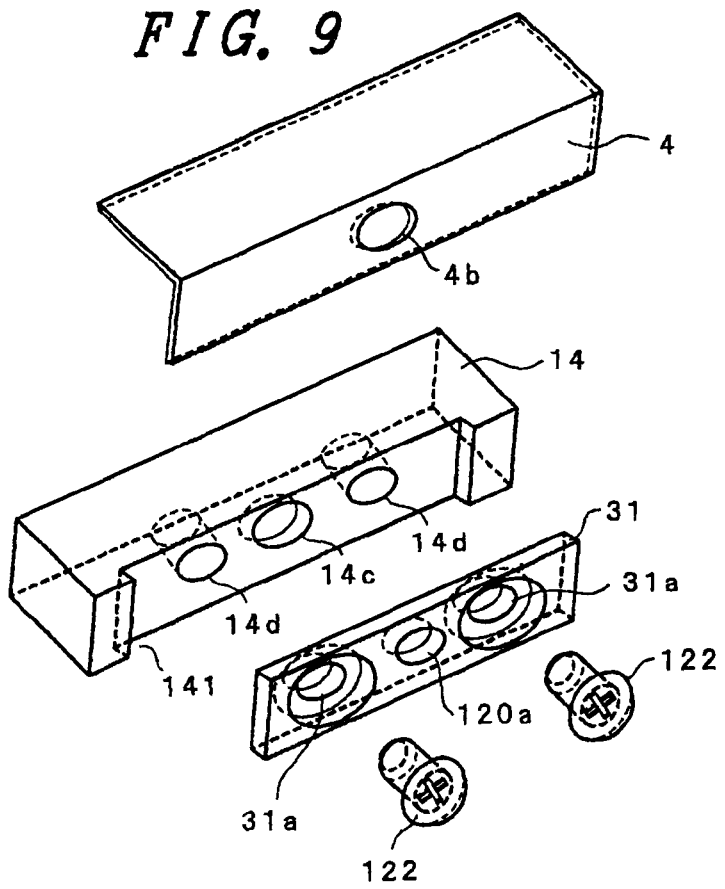
FIG. 9 is a view for explaining a fitting method of a plate nut of a liquid crystal display module of embodiment 5 of the present invention.

FIG. 9 is a view for explaining a fitting method of a plate nut of a liquid crystal display module of the present embodiment.

Incidentally, since the structure of the liquid crystal display module of the present embodiment is also the same as the liquid crystal display module shown in FIG. 1, in FIG. 9, only portions relating to fixing (see FIG. 3) of a liquid crystal display device and an exterior case of a personal computer or the like by a fitting screw 120 are shown similarly to FIG. 7, and illustration of the other structure is omitted.

In the present embodiment, before a mold 14 is covered with a frame 4, a compromise plate nut 31 is fixed to a predetermined position of the mold 14 by a screw 122.

Incidentally, in the present embodiment, a roughness for positioning may be provided to the compromise plate nut 31 and the mold 14.

In a cut hole 31a provided in the compromise plate nut 31 for fixing to the mold 14, it is desirable that a concave portion in which a head of the screw 122 is inserted, is provided at the periphery of a tapped hole at a frame side, so that the head of the screw 122 does not protrude from the compromise plate nut 31.

The screw 122 can be made a flush bolt, and also in this case, it is possible to prevent the screw 122 from protruding from the compromise plate nut 31.

It is also possible to tighten the frame 4, the mold 14, and the compromise plate nut 31 together by the screw 122, and in that case, in the frame 4, at a screwing portion, it is necessary to provide a concave portion in which the head of the screw 122 is inserted. Further, it is desirable to shave the plate thickness of the compromise plate nut 31 in accordance with the concave portion of the frame 4.

Like this, since the compromise plate nut 31 is previously fixed to the mold 14 by the screw 122, the present embodiment facilitates fitting of the compromise plate nut 31 to the mold, and is able to prevent the compromise plate nut 31 from being dropped off in an assembling process of the liquid crystal display module and to improve work efficiency.

[Embodiment 6]
<Feature of a TFT system liquid crystal display module of embodiment 6 of the present invention>

Figure 10:
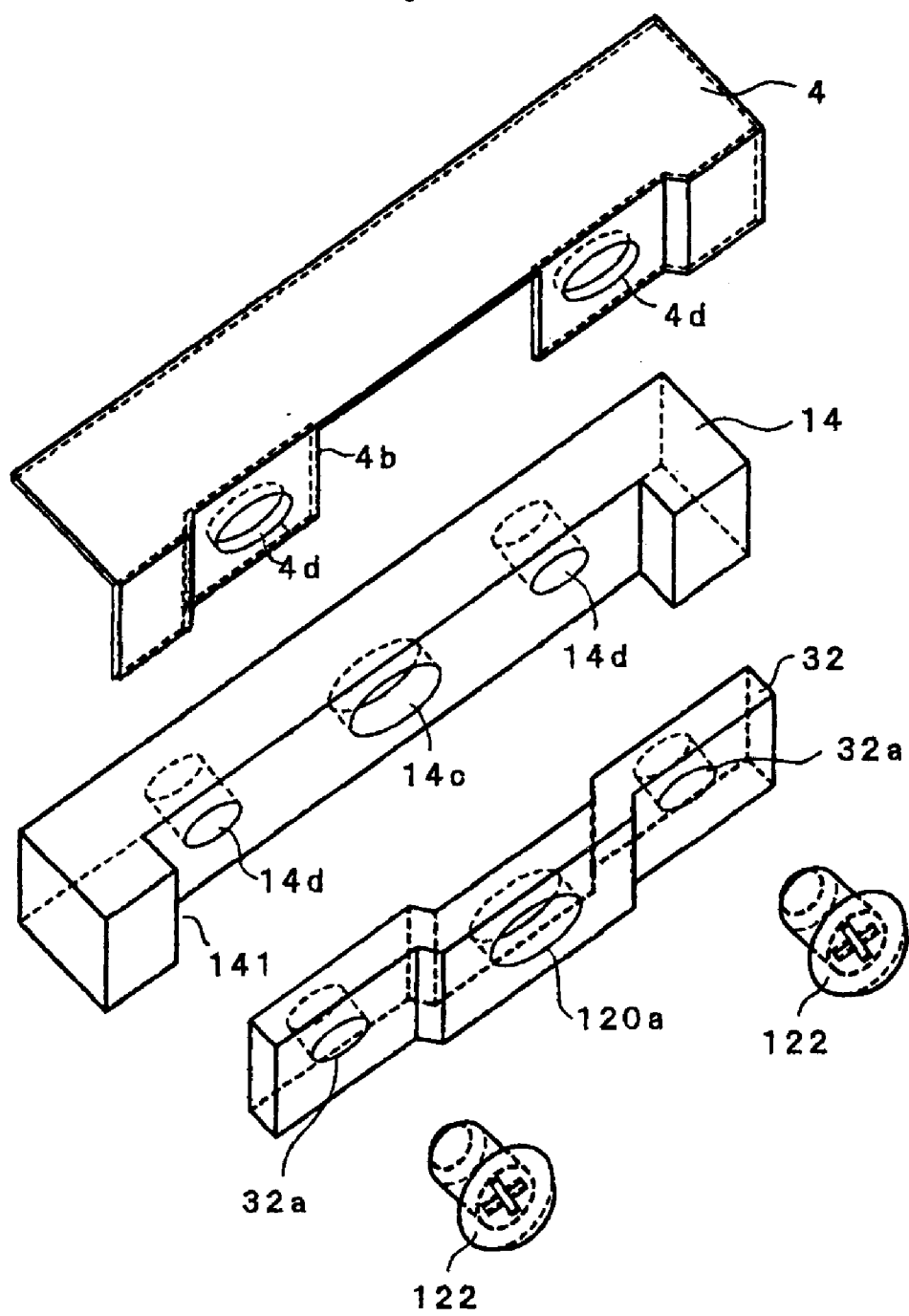
FIG. 10 is a view for explaining a fitting method of a compromise ridged nut of a liquid crystal display module of embodiment 6 of the present invention.

FIG. 10 is a view for explaining a fitting method of a compromise ridged nut of a liquid crystal display module of the present embodiment.

Incidentally, since the structure of the liquid crystal display module of the present embodiment is also the same as the liquid crystal display module shown in FIG. 1, in FIG. 10, only portions relating to fixing (see FIG. 3) of a liquid crystal display device and an exterior case of a personal computer or the like by a fitting screw 120 are shown similarly to FIG. 7, and illustration of the other structure is omitted.

In the present embodiment, a compromise ridged nut 32 has a cut hole 32a in which a screw 122 for fixing a frame 4 to a mold 14 is inserted, and a tapped hole 120a in which the fitting screw 120 (for example, see FIG. 3) for fitting the liquid crystal display device to the housing of the notebook-size personal computer is inserted, and has a step provided between a portion where the tapped hole 120a is provided and its periphery, and the nut is fixed to the mold 14 by the screw 122.

As shown in FIG. 10, when viewed from the outside of the liquid crystal display device, the surface where the tapped hole 120a of the compromise plate nut 32 is provided, rises from the surface where the cut hole 32a is provided. In other words, the surface of the compromise ridged nut 32 at the side of the side wall of the frame 4 includes the portion (for example, called a central portion) where the tapped hole 120a is provided and portions (for example, called peripheral portions) respectively extending from both the sides facing each other, and the surface of the central portion protrudes toward the side of the side wall of the frame 4 from the surfaces of the peripheral portions. Accordingly, the illustrated shape of the compromise ridged nut 32 is characterized by having a step in the thickness direction of one of the side wall of the mold 14 to which this nut is provided and the side wall of the frame 4.

As is apparent from FIG. 10, in the present embodiment, the tapped hole 120a in which the fitting screw 120 for fitting to the notebook-size personal computer is inserted, is not covered with the frame 4.

Similarly to the examples of FIGS. 8 and 9, also in the present embodiment, a concave portion 141 is formed in the side wall of the mold 14 in its thickness direction, and further, in the present embodiment, the side wall of the frame 4 is made depressed toward the side of the mold side wall in connection with the concave portion 141.

An opening 4d used for fitting the compromise ridged nut 32 to the mold 14 by the screw 122 is formed in the concave portion of the side wall of the frame, and the concave portion of the side wall of the frame 4 functions as a washer between the head of the screw 122 and the compromise ridged nut 32 at the periphery of the opening 4d.

An opening 4b corresponding to the step of the compromise ridged nut 32 is also formed in the concave portion of the side wall of the frame 4.

The opening 4b shown in the present embodiment is formed, similarly to that explained with reference to FIGS. 5A, 5B, 6A and 6B, as a so-called notch in which a part of the side wall of the frame surrounding the opening 4b is removed.

This opening 4b suppresses the movement of the portion of the compromise ridged nut 32 protruding toward the side opposite to the mold 14 at its right and left end portions.

Thus, even if an error between the length of the compromise ridged nut 32 and the length of the concave portion 141 of the mold 14 in which this is inserted becomes large, the deviation of the compromise ridged nut 32 in the length direction (horizontal direction when viewed from the liquid crystal display module) resulting from this can be suppressed by the opening 4b.

Accordingly, in the present embodiment, in the case where the liquid crystal display module is fitted to the notebook-size personal computer, the fitting screw 120 is screwed up to the compromise ridged nut 32 through the hole formed in the exterior case (100 of FIG. 3) of the display portion of the notebook-size personal computer and the metal side beam (110 of FIG. 3), so that the liquid crystal display module is fitted to the notebook-size personal computer.

Incidentally, in the present embodiment, a roughness for positioning may be provided to the compromise ridged nut 32 and the mold 14.

Besides, in the cut hole 32a provided in the compromise ridged nut 32 for fixing to the mold 14, it is desirable that a concave portion in which a head of the screw 122 is inserted, is provided at the periphery of a tapped hole at a frame side, so that the head of the screw 122 does not protrude from the compromise ridged nut 32.

Besides, the screw 122 can be made a flush bolt, and also in this case, it is possible to prevent the screw 122 from protruding from the compromise ridged nut 32.

Like this, since the compromise ridged nut 32 is fixed to the mold 14 by the screw 122, the present embodiment facilitates fitting of the compromise ridged nut 32 to the mold 14, and is able to prevent the compromise ridged nut 32 from being dropped off in an assembling process of the liquid crystal display module and to improve work efficiency.

[Embodiment 7]
<Feature of a TFT system liquid crystal display module of embodiment 7 of the present invention>

Figure 11:
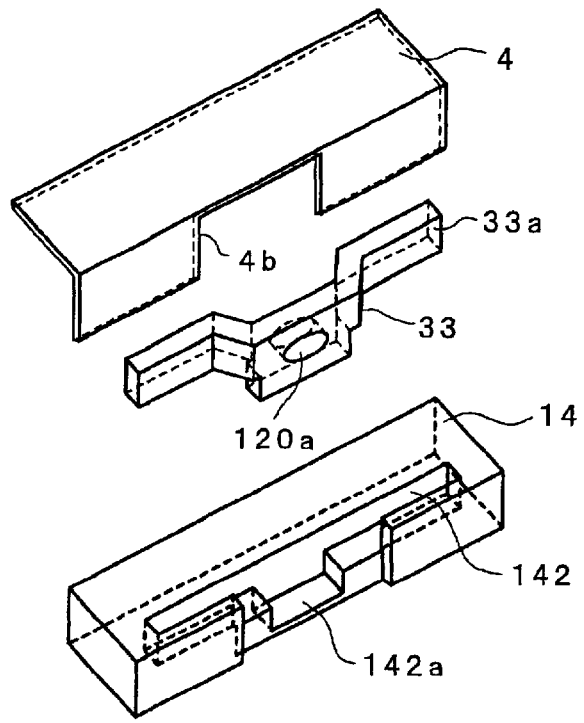
FIG. 11 is a view for explaining a fitting method of a compromise ridged nut of a liquid crystal display module of embodiment 7 of the present invention.

FIG. 11 is a view for explaining a fitting method of a compromise ridged nut of a liquid crystal display module of the present embodiment.

Incidentally, since the structure of the liquid crystal display module of the present embodiment is also the same as the liquid crystal display module shown in FIG. 1, in FIG. 11, only portions relating to fixing (see FIG. 3) of a liquid crystal display device and an exterior case of a personal computer or the like by a fitting screw 120 are shown similarly to FIG. 7, and illustration of the other structure is omitted.

In the present embodiment, a compromise ridged nut 33 provided with a T-shaped protruded portion 33a is used, and a slit (groove) 142 in which the T-shaped protruded portion 33a of the compromise ridged nut 33 is inserted, is provided in a mold 14, and the compromise ridged nut 33 is inserted in the slit 142 formed in the mold 14 from above.

According to the present embodiment, the slit 142 formed in the mold 14 restrains the movement of the compromise ridged nut 33 in the cross direction (thickness direction of the mold side wall) and in the horizontal direction (extending direction of the slit 142), and its rotation.

Besides, by covering the opening of the slit 142 provided on the upper surface of the mold 14 with the frame 4, the movement of the compromise ridged nut 32 in the vertical direction (thickness direction of the liquid crystal display module) is restrained.

A recess 142a for providing a space which receives an end portion of the fitting screw (120 of FIG. 3) projecting through a tapped hole 120a to the mold side, is formed at the central portion of the slit 142.

As is apparent from FIG. 11, in the present embodiment, the tapped hole 120a to which the fitting screw 120 for fitting to the notebook-size personal computer is screwed, is not covered with the frame 4.

Accordingly, in the present embodiment, in the case where the liquid crystal display module is fitted to the notebook-size personal computer, the fitting screw 120 is screwed up to the compromise ridged nut 33 through the hole formed in the exterior case (100 of FIG. 3) of the display portion of the notebook-size personal computer and the metal side beam (110 of FIG. 3), so that the liquid crystal display module is fitted to the notebook-size personal computer.

Incidentally, in the present embodiment, the exterior of the wall portion of the slit 142 in which the T-shaped protruded portion 33a is inserted may be covered with the frame 4 or may not be covered therewith.

Figure 12:
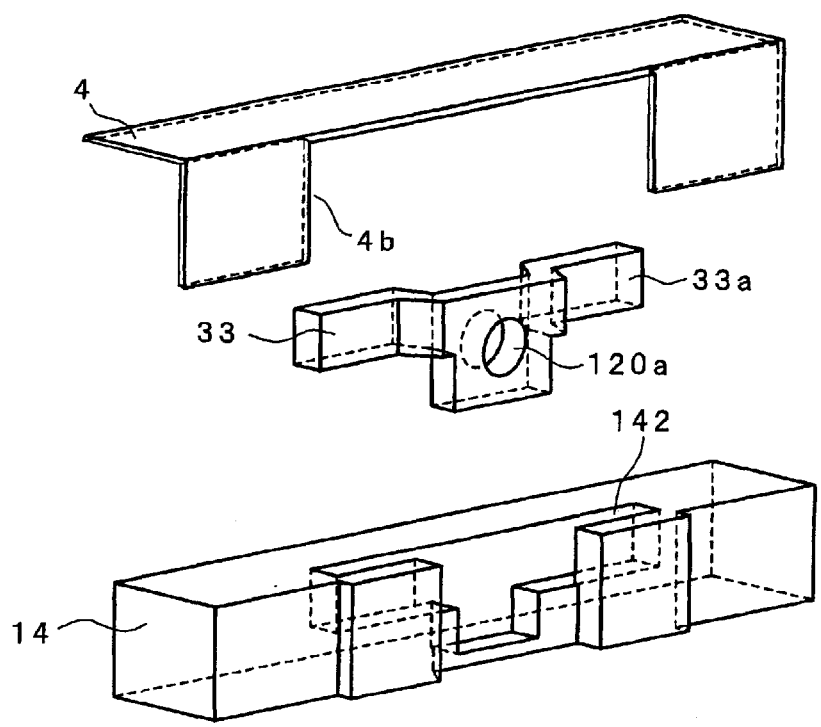
FIG. 12 is a view for explaining another fitting method of the compromise ridged nut of the liquid crystal display module of the embodiment 7 of the present invention.

As shown in FIG. 12, when it is not covered with the frame 4, although the picture frame width of the liquid crystal display module can be reduced by the thickness of the frame 4, the strength weakens to the contrary since a portion without a vertical wall of the frame 4 becomes large.

Like this, since the compromise ridged nut 33 is held by the slit 142 provided in the mold 14, the present embodiment facilitates fitting of the compromise ridged nut 33 to the mold 14, and is able to prevent the compromise ridged nut from being dropped off in an assembling process of the liquid crystal display module and to improve work efficiency.

[Embodiment 8]
<Feature of a TFT system liquid crystal display module of embodiment 8 of the present invention>

Figure 13:
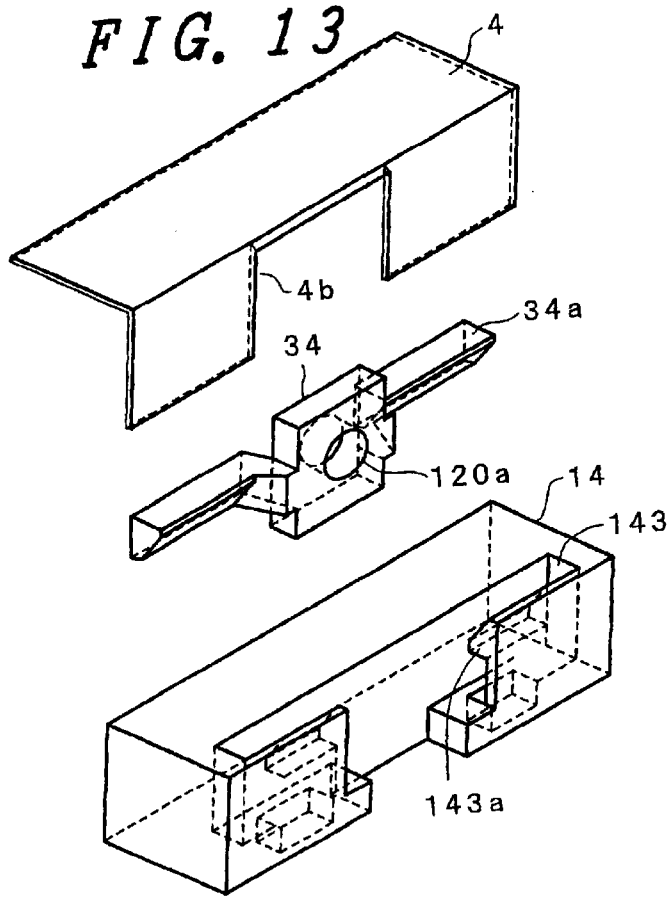
FIG. 13 is a view for explaining a fitting method of a compromise ridged nut of a liquid crystal display module of embodiment 8 of the present invention.

FIG. 13 is a view for explaining a fitting method of a compromise ridged nut of a liquid crystal display module of the embodiment 8 of the present invention.

Incidentally, since the structure of the liquid crystal display module of the present embodiment is also the same as the liquid crystal display module shown in FIG. 1, in FIG. 13, only portions relating to fixing (see FIG. 3) of a liquid crystal display device and an exterior case of a personal computer or the like by a fitting screw 120 are shown similarly to FIG. 7, and illustration of the other structure is omitted.

Also in the present embodiment, a compromise ridged nut 34 provided with a T-shaped protruded portion 34a is used, a slit (groove) 143 in which the T-shaped protruded portion 34a of the compromise ridged nut 34 is inserted, is provided in a mold 14, and the compromise ridged nut 34 is inserted in the slit 143 formed in the mold 14 from above.

However, the present embodiment is different from the liquid crystal display module of the embodiment 7 in that the lower surface of the protruded portion 34a of the compromise ridged nut 34 is chamfered and eaves 143a for preventing the compromise ridged nut 34 from being drawn out upwards from the mold 14 are provided at the slit 143 provided in the mold 14.

Incidentally, a side of the eave 143a is chamfered so that the compromise ridged nut 34 can easily enter.

The present embodiment also facilitates fitting of the compromise ridged nut 34 to the mold 14, and is able to prevent the compromise ridged nut 34 from being dropped off in an assembling process of the liquid crystal display module and to improve work efficiency.

[Embodiment 9]
<Feature of a TFT system liquid crystal display module of embodiment 9 of the present invention>

Figure 14:
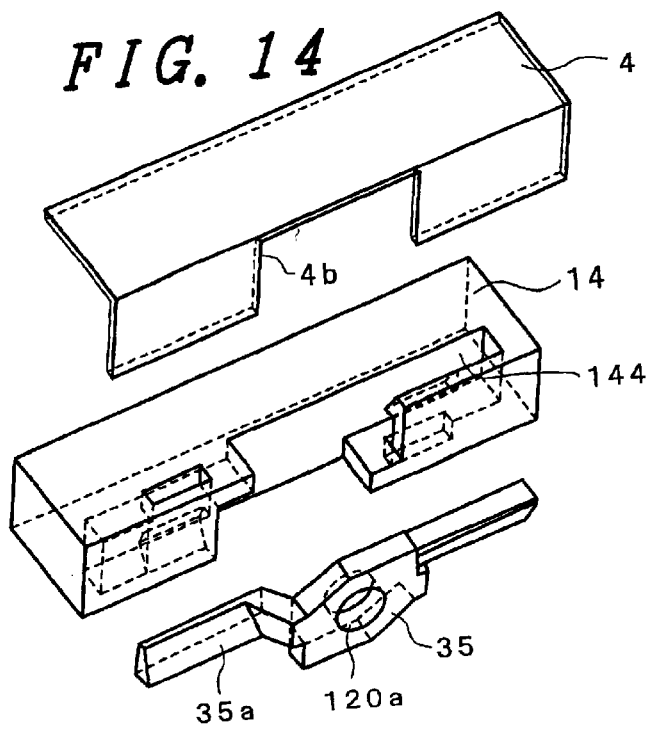
FIG. 14 is a view for explaining a fitting method of a compromise ridged nut of a liquid crystal display module of embodiment 9 of the present invention.

FIG. 14 is a view for explaining a fitting method of a compromise ridged nut of a liquid crystal display module of the present embodiment.

Incidentally, since the structure of the liquid crystal display module of the present embodiment is also the same as the liquid crystal display module shown in FIG. 1, in FIG. 14, only portions relating to fixing (see FIG. 3) of a liquid crystal display device and an exterior case of a personal computer or the like by a fitting screw 120 are shown similarly to FIG. 7, and illustration of the other structure is omitted.

The present embodiment is different from the liquid crystal display module of the embodiment 8 in that a compromise ridged nut 35 is rotated to be inserted in a slit (groove) 144 formed in a mold 14.

In the present embodiment, chamfering of a protruded portion 35a of the compromise ridged nut 35 is provided to a surface in a rotation advancing direction of the fitting screw 120 for fitting the liquid crystal display module to the notebook-size personal computer.

The present embodiment also facilitates fitting of the compromise ridged nut 35 to the mold 14, and is able to prevent the compromise ridged nut 35 from being dropped off in an assembling process of the liquid crystal display module and to improve work efficiency.

[Embodiment 10]
<Feature of a TFT system liquid crystal display module of embodiment 10 of the present invention>

Figure 15:
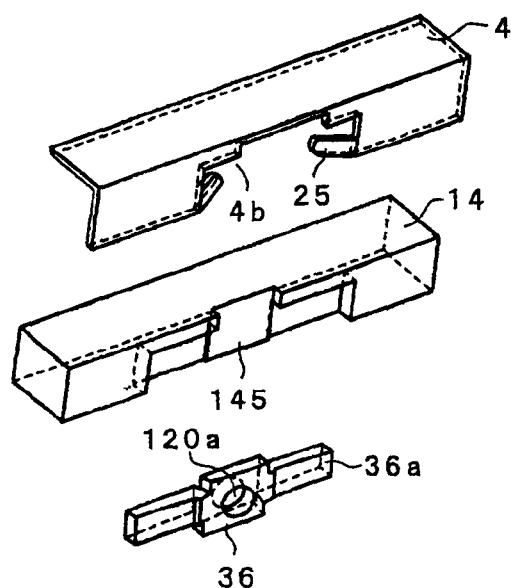
FIG. 15 is a view for explaining a fitting method of a compromise ridged nut of a liquid crystal display module of embodiment 10 of the present invention.

FIG. 15 is a view for explaining a fitting method of a compromise ridged nut of a liquid crystal display module of the embodiment 10 of the present invention.

Incidentally, since the structure of the liquid crystal display module of the present embodiment is also the same as the liquid crystal display module shown in FIG. 1, in FIG. 15, only portions relating to fixing (see FIG. 3) of a liquid crystal display device and an exterior case of a personal computer or the like by a fitting screw 120 are shown similarly to FIG. 7, and illustration of the other structure is omitted.

In the present embodiment, a compromise ridged nut 36 provided with a T-shaped protruded portion 36a is used, and after a mold 14 is covered with a frame 4, the compromise ridged nut 36 is inserted in a concave portion 145 formed in the mold 14, and is fixed by bending a pawl 25 of the frame 4.

The present embodiment is also able to prevent the compromise ridged nut 36 from being dropped off in an assembling process of the liquid crystal display module and to improve work efficiency.

Further, in the present embodiment, contrary to the aforementioned respective embodiments, since it is not necessary that the compromise ridged nut 36 is fixed to the mold 14 by the screw 122 or is inserted in the slits 142, 143, 144 of the mold 14, fitting of the compromise ridged nut 36 to the mold 14 becomes easy as compared with the aforementioned respective embodiments, and work efficiency can be improved.

[Embodiment 11]
<Feature of a TFT system liquid crystal display module of embodiment 11 of the present invention>

Figure 16A:
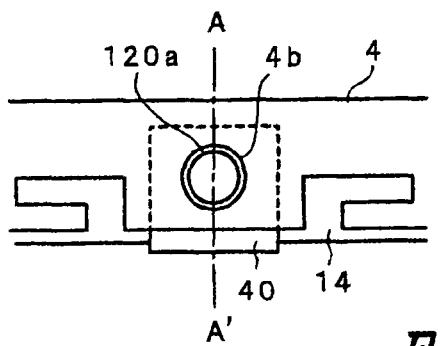
FIGS. 16A to 16C are views for explaining a fitting method of a C-shaped nut of a liquid crystal display module of embodiment 11 of the present invention.
Figure 16B:
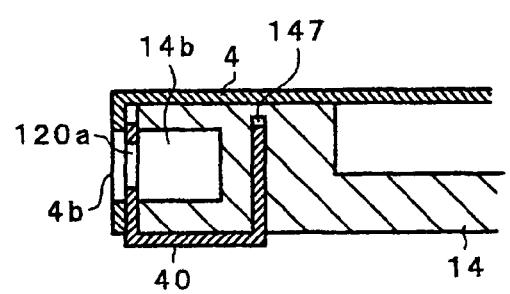
Figure 16C:
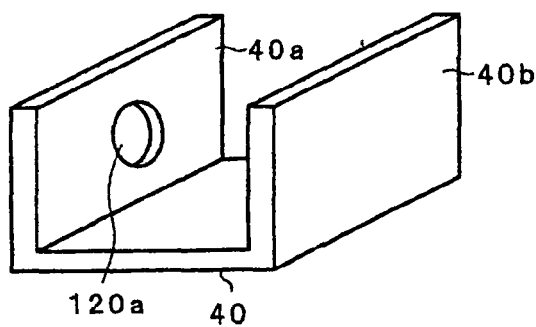

FIGS. 16A to 16C are views for explaining a fitting method of a C-shaped nut 40 to a liquid crystal display module of the present embodiment, FIG. 16A is a front view of the liquid crystal display module, FIG. 16B is a main portion sectional view showing a sectional structure along line A–A' shown in FIG. 16A, and FIG. 16C is a perspective view showing a shape of the metal plate 40.

Incidentally, since the structure of the liquid crystal display module of the present embodiment is also the same as the liquid crystal display module shown in FIG. 1, in FIGS. 16A to 16C, only portions relating to a fitting screw 120 are shown similarly to FIG. 4, and the other structure is omitted.

In the present embodiment, the C-shaped (channel type) nut 40 is used, a side wall 40a of the C-shaped nut 40 in which a tapped hole 120a is provided, is arranged at a portion of a side wall of a mold 14 where a hole 146 in which the fitting screw 120 is inserted is formed, the other side wall 40b is inserted in a slit (groove) 147 formed in the mold 14, and the C-shaped nut 40 is fixed by the elasticity of the C-shaped nut itself.

The present embodiment is also able to prevent the C shaped nut 40 from being dropped off in an assembling process of the liquid crystal display module and to improve work efficiency.

[Embodiment 12]
<Feature of a TFT system liquid crystal display module of embodiment 12 of the present invention>

Figure 17A:
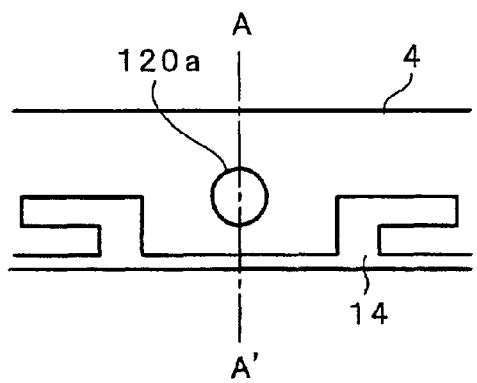
FIGS. 17A and 17B are views for explaining a frame of a liquid crystal display module of embodiment 12 of the present invention.
Figure 17B:
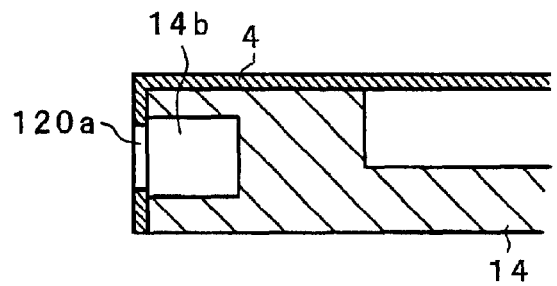

FIGS. 17A and 17B are views for explaining a frame 4 of a liquid crystal display module of the present embodiment, FIG. 17A is a front view of the liquid crystal display module (frame 4), and FIG. 17B is a main portion sectional view showing a sectional structure along line A–A' shown in FIG. 17A.

Incidentally, since the structure of the liquid crystal display module of the present embodiment is also the same as the liquid crystal display module shown in FIG. 1, in FIGS. 17A and 17B, only portions relating to a fitting screw 120 are shown, and the other structure is omitted.

In the present embodiment, a tapped hole 120a is provided in the frame itself, and a hole 146 in which the fitting screw 120 is inserted is formed in a side wall of a mold 14, so that the fitting screw 120 is screwed to this tapped hole 120a.

Accordingly, in the present embodiment, since the plate nut or the compromise ridged nut is not necessary contrary to the aforementioned respective embodiments, the number of parts can be lessened, and a screw mechanism of the fitting screw 120 can be simplified.

[Embodiment 13]
<Feature of a TFT system liquid crystal display module of embodiment 13 of the present invention>

Figure 18A:
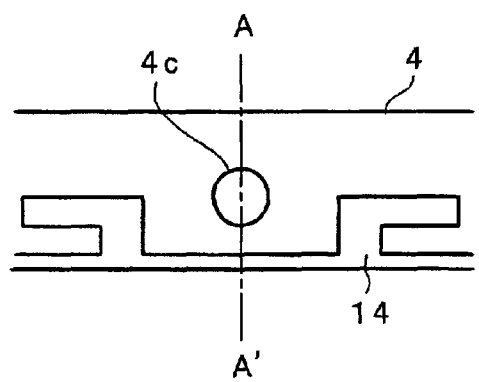
FIGS. 18A and 18B are views for explaining a fitting method of a leaf spring nut of a liquid crystal display module of embodiment 13 of the present invention.
Figure 18B:
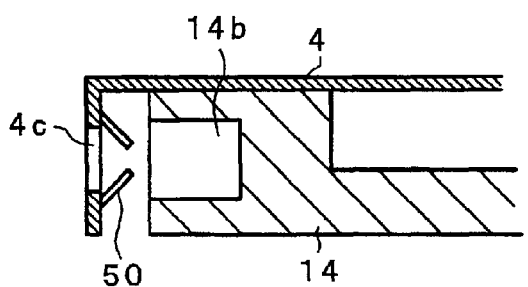

FIGS. 18A and 18B are views for explaining a fitting method of a leaf spring nut 50 of a liquid crystal display module of the embodiment 13 of the present invention, FIG. 18A is a front view of the liquid crystal display module, and FIG. 18B is a main portion sectional view showing a sectional structure along line A–A' shown in FIG. 18A.

Incidentally, since the structure of the liquid crystal display module of the present embodiment is also the same as the liquid crystal display module shown in FIG. 1, in FIGS. 18A and 18B, only portions relating to a fitting screw 120 are shown, and the other structure is omitted.

In the present embodiment, a hole 4c through which the fitting screw 120 passes is provided in a frame 4, the leaf spring nut 50 is fitted to the back (side wall of a mold 14) side of the hole 4c by welding or the like, and the fitting screw 120 is screwed to the leaf spring nut 50.

In the embodiment, although the leaf spring nut 50 is provided at upper and lower places of the hole 4c of the frame 4, this may be provided at right and left places of the hole 4c, or may be provided so as to surround the hole 4c.

The present embodiment facilitates fitting of the leaf spring nut 50 to the frame 4, and is able to prevent the leaf spring nut 50 from being dropped off in an assembling process of the liquid crystal display module and to improve work efficiency.

Figure 19:
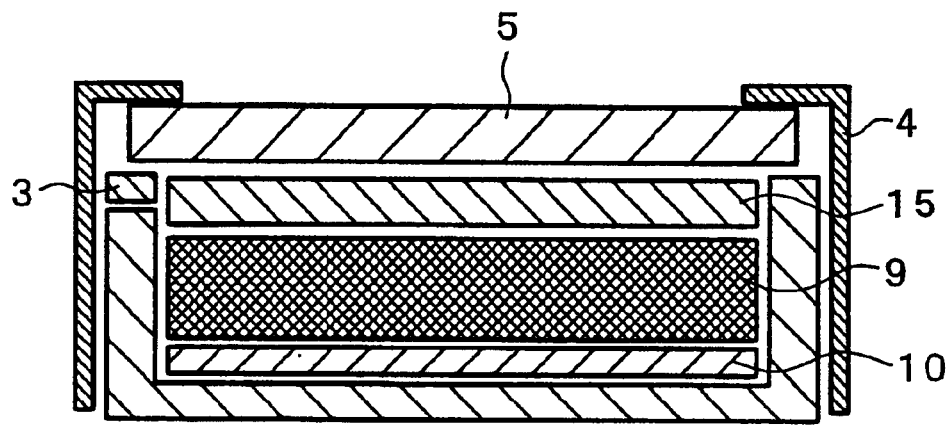
FIG. 19 is a sectional view showing a main portion sectional structure of a liquid crystal display module which is reduced in thickness.

[Embodiment 14]
In the liquid crystal display module shown in FIG. 1, although the driving circuit board 3 is arranged at the rear side (rear side of the mold 14) of the backlight unit, in order to further reduce the thickness of the liquid crystal display module, as shown in FIG. 19, it is effective to arrange the driving circuit board 3 between the liquid crystal display panel 5 and the side wall of the mold 14. In the case where the liquid crystal display module is in an active matrix driving system, a driving circuit (semiconductor integrated circuit device) for supplying a scanning signal or a video signal to a liquid crystal display element is mounted on the driving circuit board, or a wiring line for supplying a signal or driving power to the driving circuit is formed thereon. In the case where the liquid crystal display module is in a passive matrix driving system, a driving circuit for supplying a common signal or a segment signal to a liquid crystal display element is mounted on the driving circuit board or a wiring line for supplying a signal or driving power to the driving circuit is formed thereon.

FIG. 19 is a schematic sectional view showing the sectional structure of the liquid crystal display module which is made thin, and FIG. 19 shows a sectional structure obtained by cutting in the same direction as the extending direction of the cold-cathode fluorescent lamp 16.

Further, FIG. 19 shows diffusion sheets 6, 8 and two lens sheets 7 together as an optical element 15.

However, in the liquid crystal display module shown in FIG. 19, since the driving circuit board 3 is arranged on the side wall of the mold 14, for example, as in the embodiment 12, in the case where the fitting screw 120 is screwed to the tapped hole 120a provided in the frame 4, there is a problem that a portion of the fitting screw 120 protruding from the tapped hole 120a to the mole side interferes with the driving circuit board 3.

In order to solve this problem, although there is a method in which the picture frame region of the liquid crystal display module is widened so that the fitting screw 120 does not interfere with the driving circuit board 3, in this case, both the reduction in picture frame width and the reduction in thickness can not be achieved.

The liquid crystal display device of the embodiment 14 of the present invention resolves such situations as mentioned previously by features thereof which will be described as follows.

<Feature of a TFT system liquid crystal display module of embodiment 14 of the present invention>

Figure 20:
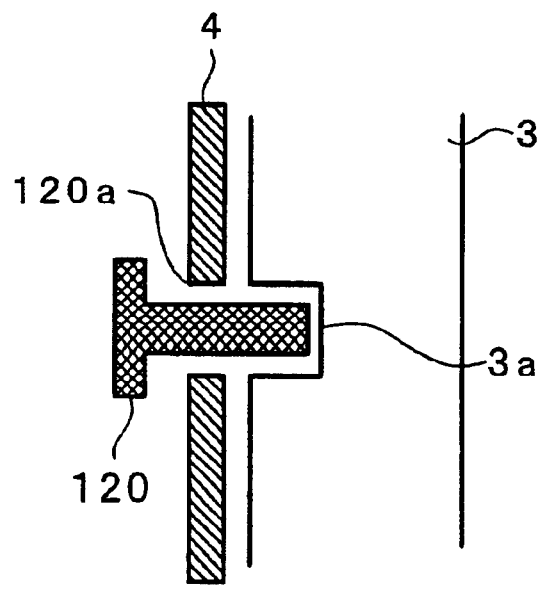
FIG. 20 is a plan view conceptually showing a plane shape of a driving circuit board of a liquid crystal display module of embodiment 14 of the present invention in a thickness direction of the liquid crystal display module.

FIG. 20 is a plan view conceptually showing a plane shape of a driving circuit board of a liquid crystal display module of embodiment 14 of the present invention in a thickness direction of the liquid crystal display module.

Incidentally, since the structure of the liquid crystal display module of the present embodiment is the same as the liquid crystal display module shown in FIG. 19, in FIG. 20, only portions relating to a fitting screw 120 are shown, and illustration of the other structure is omitted.

As is apparent from FIG. 20, in the present embodiment, a notch (concave) portion 3a is formed in a driving circuit board 3 from an end portion facing a frame 4 to prevent interference between a tip of the fitting screw 120 protruding from a tapped hole 120a and the driving circuit board 3.

By this, the present embodiment is able to further reduce the thickness of the liquid crystal display module.

Incidentally, in FIG. 20, although the description has been given of the case where the fitting screw 120 is screwed to the tapped hole 4b provided in the frame 4, the present invention can also be applied to the case where the fitting screw 120 is screwed to the insert 13 embedded in the mold 14, or the nut such as the plate nut fixed to the mold 14 or the ridged nut.

Supposing the fitting screw 120 and the driving circuit board 3 are arranged at different positions (heights) in the thickness direction of the liquid crystal display module, and the fitting screw 20 is projected to the concave portion 3a of the driving circuit board 3 in this thickness direction as shown in FIG. 20, as in the embodiment 1, the interference between the upper protruded portion (14a of FIG. 4) of the portion where the insert 13 of the mold 14 is provided and the driving circuit board 3 can be avoided by the formation of the concave portion 3a.

When the example like this is supposed, even in the embodiments 4 to 10 in which the upper surface is suppressed by using the plate nut or the like, the interference between the upper surface of this plate nut and the driving circuit board 3 can also be avoided by the formation of the concave portion 3a.

[Embodiment 15]

<Feature of a TFT system liquid crystal display module of embodiment 15 of the present invention>

Figure 21A:
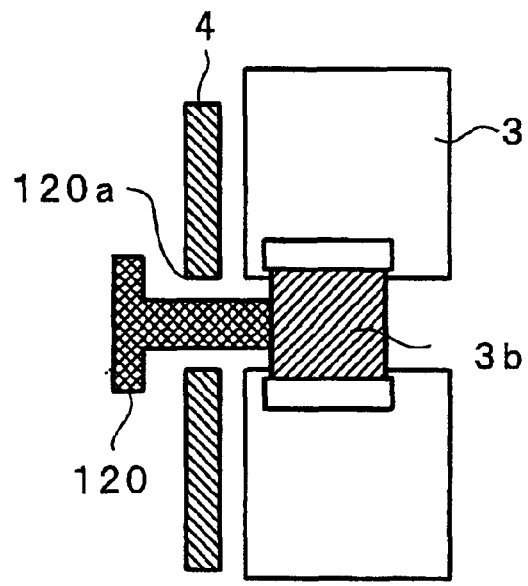
FIGS. 21A and 21B are views for explaining a shape of a driving circuit board of a liquid crystal display module of embodiment 15 of the present invention.
Figure 21B:
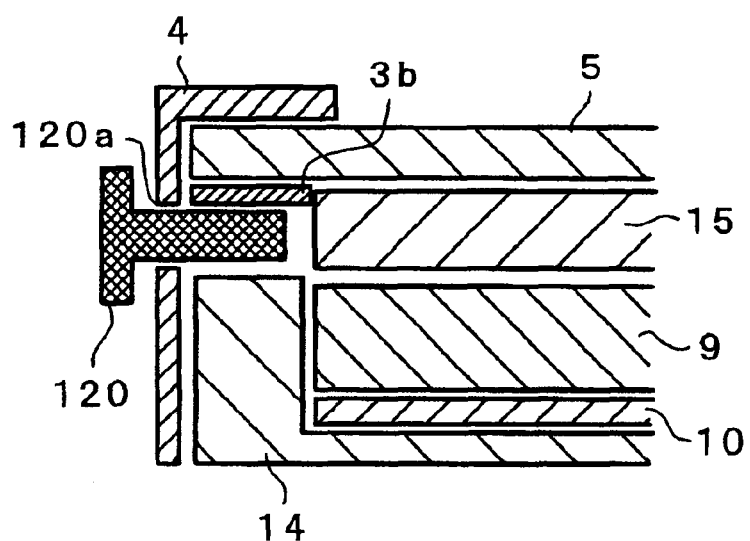
Figure 22:
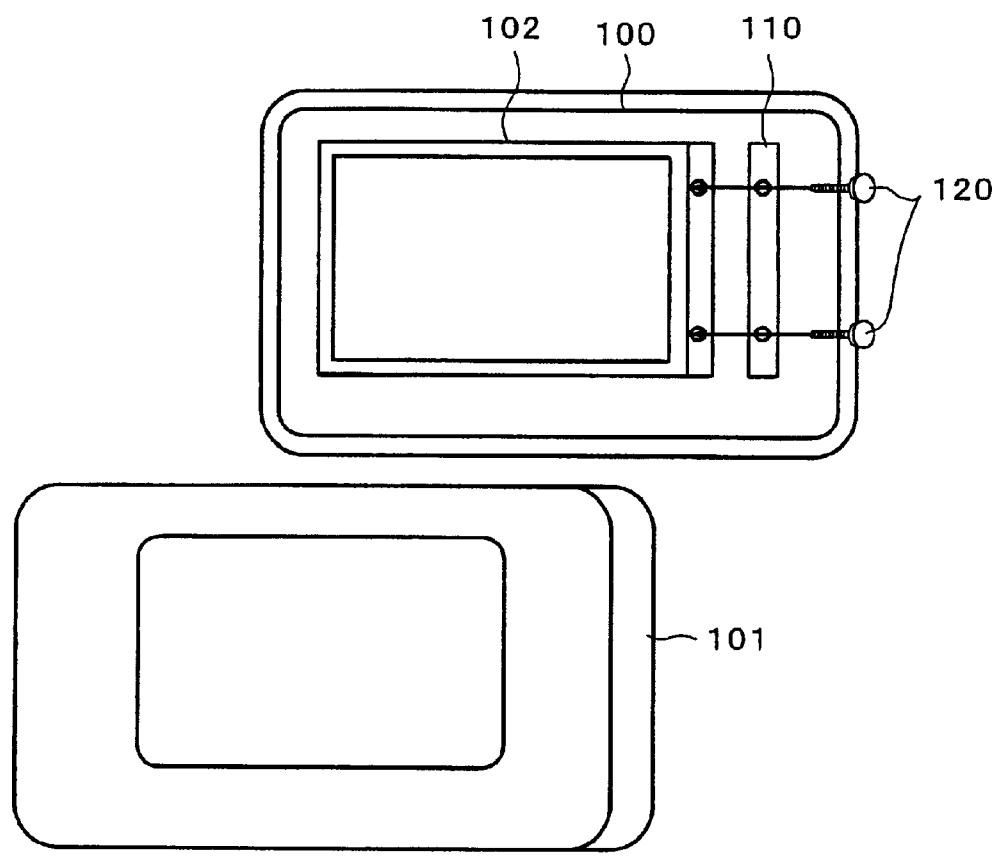
FIG. 22 is a schematic view for explaining an example of a fitting method of fitting a liquid crystal display module to a notebook-size personal computer.

FIGS. 21A and 21B are views for explaining a shape of a driving circuit board of a liquid crystal display module of embodiment 15 of the present invention, FIG. 21A is a plan view showing the relation among a fitting screw 120, a frame 4, and a driving circuit board 3, and FIG. 21B is a main portion sectional view showing the relation among the fitting screw 120, the frame 4, and the driving circuit board 3.

Incidentally, since the structure of the liquid crystal display module of the present embodiment is the same as the liquid crystal display module shown in FIG. 19, in FIGS. 21A and 21B, only portions relating to the fitting screw 120 are shown, and the other structure is omitted.

As is apparent from FIG. 21A, in the present embodiment, the driving circuit board 3 is divided in two, the fitting screw 120 is entered a divided portion, the two divided driving circuit boards are connected by a flexible wiring board 3b, and by this, the interference between the fitting screw 120 and the driving circuit board 3 is prevented.

Accordingly, the present embodiment is also able to further reduce the thickness of the liquid crystal display module.

Incidentally, in FIGS. 21A and 21B, although the description has been given of the case where the fitting screw 120 is screwed to the tapped hole 4b provided in the frame 4, the present invention can be applied also to the case where the fitting screw 120 is screwed to the insert 13 embedded in the mold 14, or the nut such as the plate nut fixed to the mold 14 or the ridged nut.

Incidentally, in the aforementioned respective embodiments, although the description has been mainly given of the embodiments in which the present invention is applied to the TFT system liquid crystal display module, it is needless to say that the present invention can also be applied to an STN system liquid crystal display module.

In the foregoing, although the present invention made by the present inventor has been specifically described on the basis of the embodiments, the present invention is not limited to the embodiments, but can be naturally variously modified in the scope not departing from the gist.

Typical effects obtained by the present invention disclosed in the present application are briefly explained as follows:

(1) According to the liquid crystal display device of the present invention, the screw member to which the fitting screw for fixing the liquid crystal display device to the exterior case is screwed, can be simply and certainly fitted.

(2) According to the liquid crystal display device of the present invention, the screw mechanism of the fitting screw for fixing the liquid crystal display device to the exterior case can be simplified.

(3) According to the liquid crystal display device of the present invention, the thickness of the liquid crystal display device can be reduced.

(4) According to the liquid crystal display device of the present invention, the picture frame width of the liquid crystal display device can be reduced.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device comprising:

a liquid crystal display element;

a frame member being arranged at a displaying surface side of the liquid crystal display element, and having a display window;

a light source being arranged at an opposite surface of the liquid crystal display element to the displaying surface thereof and irradiating the liquid crystal display element with illumination light; and a housing member having a side wall formed at a periphery thereof and housing the light source therein, wherein the frame member is fixed to the housing member and the frame member has a side wall extended along a thickness direction of the liquid crystal display element and opposite to an outer surface of the side wall of the housing member, a plate nut having a tapped hole into which a fitting screw for fixing the liquid crystal display device to an exterior case is screwed, the plate nut being fixed in a concave portion formed at the side wall of the housing member.

2. A liquid crystal display device according to claim 1, wherein the plate nut comprises a central potion having the tapped hole formed thereat and peripheral portions being formed to be integrated with the central portion at both sides of the central portion and forming a step with respect to the central portion, the peripheral portions of the plate nut being fixed to the side wall of the housing member.

3. A liquid crystal display device according to claim 1, wherein the housing member has an opening provided at a part of the side wall thereof where the plate nut is fixed; and a part of the fitting screw protruded from tapped hole toward the housing member is housed in the opening of the housing member.

4. A liquid crystal display device according to claim 1, wherein:
   the frame member has an opening provided at a part of the side wall thereof opposite to the side wall of the housing member
   the opening is positioned opposite to the plate nut; and
   the fitting screw is screwed to the tapped hole of the plate nut through the opening.

5. A liquid crystal display device according to claim 1, wherein the housing member is molded out of resin material.

6. A liquid crystal display device according to claim 1, wherein the tapped hole of the plate nut is extended transverse to the thickness direction of the liquid crystal display device.

7. A liquid crystal display device according to claim 1, wherein the plate nut is fixed by adhesive at the side wall of the housing member.

* * * * *